(12) United States Patent
Ross

(10) Patent No.: US 6,344,800 B1
(45) Date of Patent: Feb. 5, 2002

(54) VENDING MACHINE DISPLAY

(75) Inventor: Robert D. Ross, Gibbsboro, NJ (US)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 09/340,571

(22) Filed: Jun. 28, 1999

Related U.S. Application Data

(60) Provisional application No. 60/092,047, filed on Jul. 8, 1998.

(51) Int. Cl.[7] .............................. G08B 5/00; G09G 5/00
(52) U.S. Cl. ............................ 340/815.4; 340/815.44; 340/815.53; 345/98; 345/903; 345/204
(58) Field of Search .................... 340/815.4, 815.44, 340/815.45, 815.53; 345/39, 44, 98, 902, 903, 208, 30, 33, 34, 204

(56) References Cited

U.S. PATENT DOCUMENTS

| | | | | |
|---|---|---|---|---|
| 3,925,777 A | * | 12/1975 | Clark | 340/336 |
| 4,645,303 A | * | 2/1987 | Sekiya et al. | 345/94 |
| 4,837,566 A | * | 6/1989 | Channing et al. | 315/169.3 |
| 5,070,518 A | * | 12/1991 | Botker | 377/7 |
| 5,455,598 A | * | 10/1995 | Clerc | 345/94 |
| 5,500,638 A | * | 3/1996 | George | 340/468 |
| 5,990,802 A | * | 11/1999 | Maskeny | 340/815.45 |

* cited by examiner

Primary Examiner—Donnie L. Crosland
(74) Attorney, Agent, or Firm—Fish & Richardson P.C.

(57) ABSTRACT

An improved display module for a vending machine is described. An implementation includes an enhanced display means, an inverter connected to a CLOCK input signal, and a flip-flop connected to the inverter and to a DATA input signal. The inverter and the flip-flop generate a LOAD signal for input to the enhanced display.

9 Claims, 2 Drawing Sheets

VENDING MACHINE DISPLAY

This application claims the benefit under 35 U.S.C. § 119(e)(1) of U.S. Provisional Application No. 60/092,047 filed on Jul. 8, 1998.

BACKGROUND OF THE INVENTION

The present invention pertains to apparatus and methods for generating a LOAD signal so that enhanced display modules can be used in a vending machine. In particular, the invention generates a LOAD signal from four available interface input signals for the enhanced display module.

Hundreds of thousands of vending machines exist in the field, and more are being manufactured each day. Most have four digit displays to inform customers of the value of the coinage inserted, and at least two manufacturers have standardized on a four wire interface that connects the vending machine controller (VMC) to the four digit display module. Each of the four digits consists of a seven segment display element, and the display module utilizes the following interface signals:

POWER (+5 Volts DC)
DATA (Serial data to the display)
CLOCK (Serial data shift clock)
GROUND (0 Volts)

The display capability of a vending machine can be expanded by replacing the seven-segment, four digit display module with an enhanced display module. The enhanced character display module, which typically comprises eight or more characters with a fourteen segment configuration of light emitting diodes (LED's) or a dot matrix configuration, would provide the ability to display both numeric and text information.

Several suitable display modules are currently available, but require an additional interface signal, called a "LOAD" signal, to differentiate between shifting the serial data into the module and loading it into the internal display memory. Thus, the LOAD signal must somehow be provided in order to retrofit such low cost enhanced display modules to existing vending machines, or to use them in the manufacture of new vending machines containing standard vending machine controllers (VMC's). The vending machine control boards currently in use cannot generate such a LOAD signal, and thus a software solution for upgrading to enhanced character display modules does not exist.

SUMMARY OF THE INVENTION

The present invention pertains to low-cost apparatus and methods for generating a LOAD signal from the four available interface signals available from the VMC. Thus, a standard VMC providing four input signals can be utilized in conjunction with an enhanced character display module.

In one implementation according to the invention, the apparatus includes an enhanced display module requiring at least five input signals including POWER, CLOCK, DATA, GROUND and LOAD. An inverter is connected to the CLOCK signal, and a LOAD flip-flop is connected to the inverter and to the DATA signal line. The inverter and the LOAD flip-flop generate a LOAD signal for input to the enhanced display module.

In another implementation, a display module includes an enhanced display means and an interface circuit. The interface circuit generates a LOAD signal for input to the display means. The interface circuit may be a clock pulse counter circuit means for counting the eighth transition of a CLOCK input signal to generate the LOAD signal. Alternately, the clock pulse counter circuit may be a one-shot circuit that is triggered by the eighth transition of the CLOCK signal. Further, the interface circuit may be a missing clock detector circuit for sensing stoppage of a CLOCK signal and for generating the high state of the LOAD signal.

In yet another implementation, a display module for a vending machine includes an enhanced display means, a unidirectional component connected to a POWER input signal and a capacitor connected to the unidirectional component and to the display means. In this configuration, the VMC pulses the POWER signal momentarily so that the LOAD signal is generated by the capacitor for the display means.

A novel technique for generating a LOAD signal for an enhanced display module is also described, which uses at least one of four interface signals generated by a vending machine controller. The technique includes generating and validating a DATA signal, shifting bits of data for a display segment into the display element on the rising edge of the CLOCK signal if the DATA signal is valid, inverting the CLOCK signal and latching the DATA signal to generate a LOAD signal, and loading data for a segment into the display element memory.

Other apparatus and methods fall within the scope of the invention which apparent from the figures and the detailed description below.

BRIEF DESCRIPTION OF THE DRAWINGS

Like reference numbers and designations in the various drawings indicate like elements.

DETAILED DESCRIPTION

Figure 1:
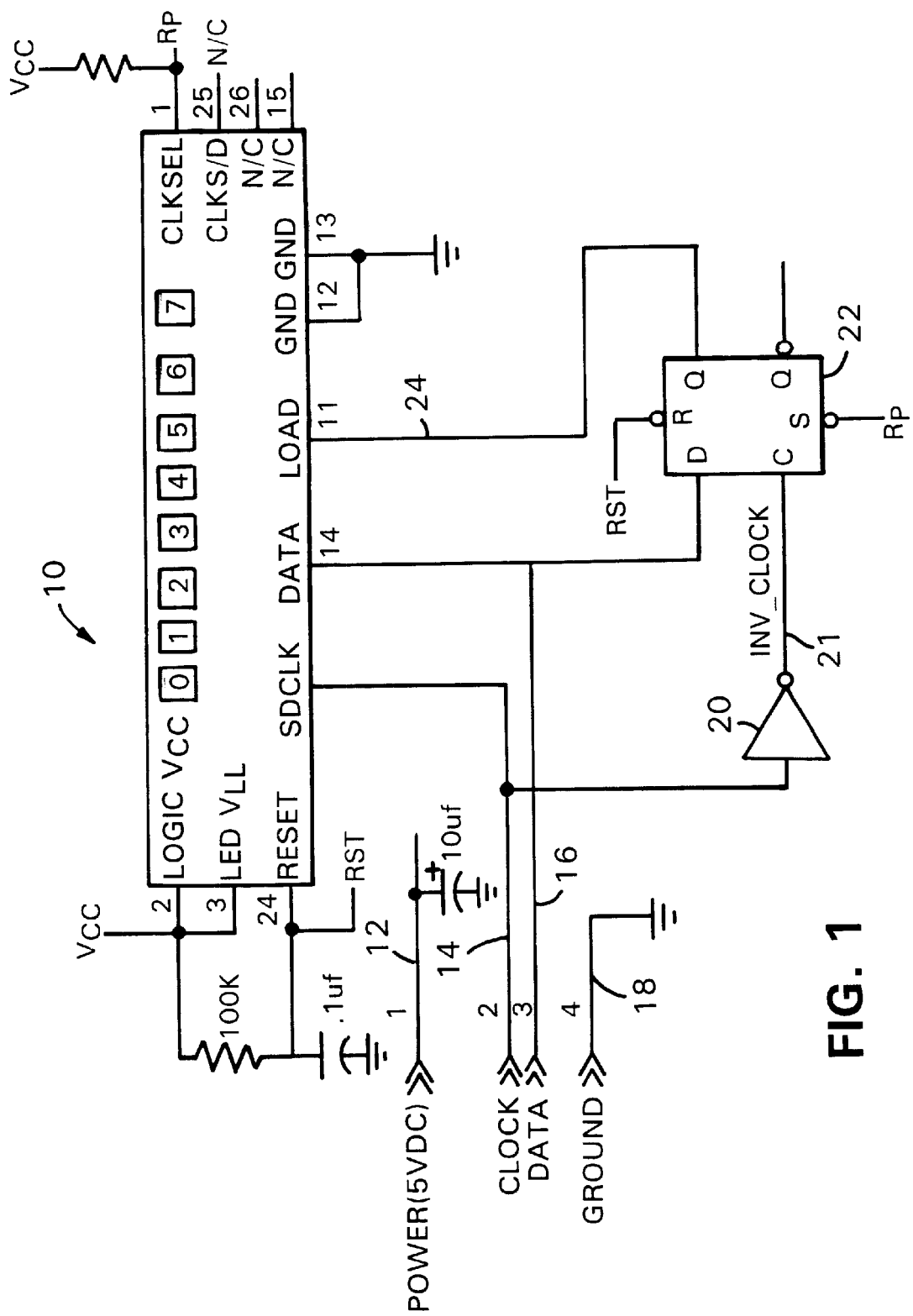
FIG. 1 depicts an implementation of an enhanced display module according to the invention.

FIG. 1 depicts an enhanced display module 10, which can be retrofit to existing vending machines utilizing standard vending machine controllers (VMC's). The display module 10 does not require hardware changes to be made to the VMC. A suitable enhanced display 11 is the eight character 5780/5782 display, for example, manufactured by Siemens Components, Inc. of Cupertino, Calif. The display 11 has eight display segments numbered zero to seven, and includes twelve pins. The eight character display requires five input signals to operate, which are shown as input lines: POWER 12, CLOCK 14, DATA 16, GROUND 18 and LOAD 24. However, the VMC's currently in use are capable of only generating the four signals POWER, CLOCK, DATA and GROUND.

It should be understood that, although the invention is described with reference to an eight-character display, other suitable displays having more characters could also be used. Further, two or more displays could be connected together to form a larger display module.

Referring to FIG. 1, an inverter 20 is connected to the CLOCK input line 14, and has an output line 21 connected to a LOAD flip-flop 22. The LOAD flip-flop 22 also has an input line connected to the DATA signal line 16, and generates the LOAD signal on line 24 for input to the display 11. Thus, the inverter 20 and the LOAD flip-flop 22 generate the required LOAD signal.

Figure 2:
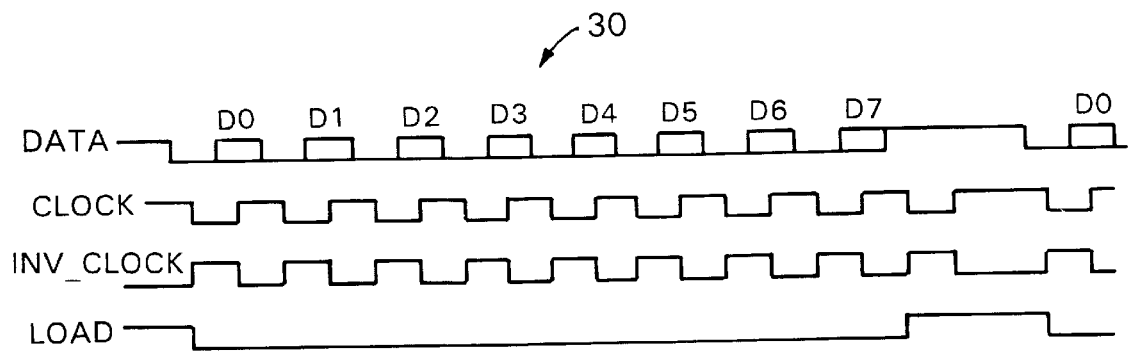
FIG. 2 is a timing diagram illustrating the loading of eight bits of data at a time into the display module.

FIG. 2 is a timing diagram 30 illustrating how eight bits of data at a time (labelled D0 to D7) are loaded into the display module for each of the eight segments of the display. The eight bits of data for the DATA signal is clocked into the display module on the rising edge of the CLOCK signal. The DATA signal must be valid a finite amount of time before and after the rising edge, but can be in an indeterminate state at any other time.

Referring again to FIG. 1, the CLOCK signal is inverted by the inverter 20, and the generated INV_CLOCK signal on line 21 is then used to latch the DATA signal into the flip-flop 22 (which could otherwise be a register or latch circuit). The output of the flip-flop 22 generates the LOAD signal such that if the DATA signal is kept in the low state during the high to low transition of the CLOCK, the LOAD signal is maintained at a low. Similarly, as long as the DATA signal is kept in the high state during the high to low transition of the CLOCK, the LOAD signal would be maintained at a high state.

In practice, the DATA signal is kept in the high state while the CLOCK is being pulsed. Operating in such a manner causes a high LOAD signal to be generated for input to the display module which prevents data from being shifted into the display.

Referring again to FIG. 2, when data is ready to be loaded into the display, the DATA signal is taken to the low state prior to the CLOCK transitioning from the high to the low state. Upon this CLOCK transition, the inverted clock signal (INV_CLOCK) on line 21 latches in the low which results in the LOAD signal going low. The DATA signal is then set to the desired high or low state (as required by the character to be displayed), and the CLOCK is taken to the high state. This operation shifts the DATA into the display as desired, and the pattern is repeated for each of the succeeding bits until the last bit (D7). Following the low to high transition of the CLOCK for the last bit, the DATA signal would be taken to the high state prior to the CLOCK transitioning from the high to the low state (INV_CLOCK transitioning from the low to the high state). When this transition occurs, the LOAD signal will go to the high state and remain there until another CLOCK high to low transition occurs with the DATA signal in the low state.

In summary, the LOAD signal is set to a low state while eight bits of data (DATA) are shifted (via the CLOCK signal) into the display module. After the eighth bit, the LOAD signal is set to a high state for a finite amount of time. The pattern repeats for each eight bits of data, one set of eight bits for each of the display segments, that is shifted into the display module.

Figure 3:
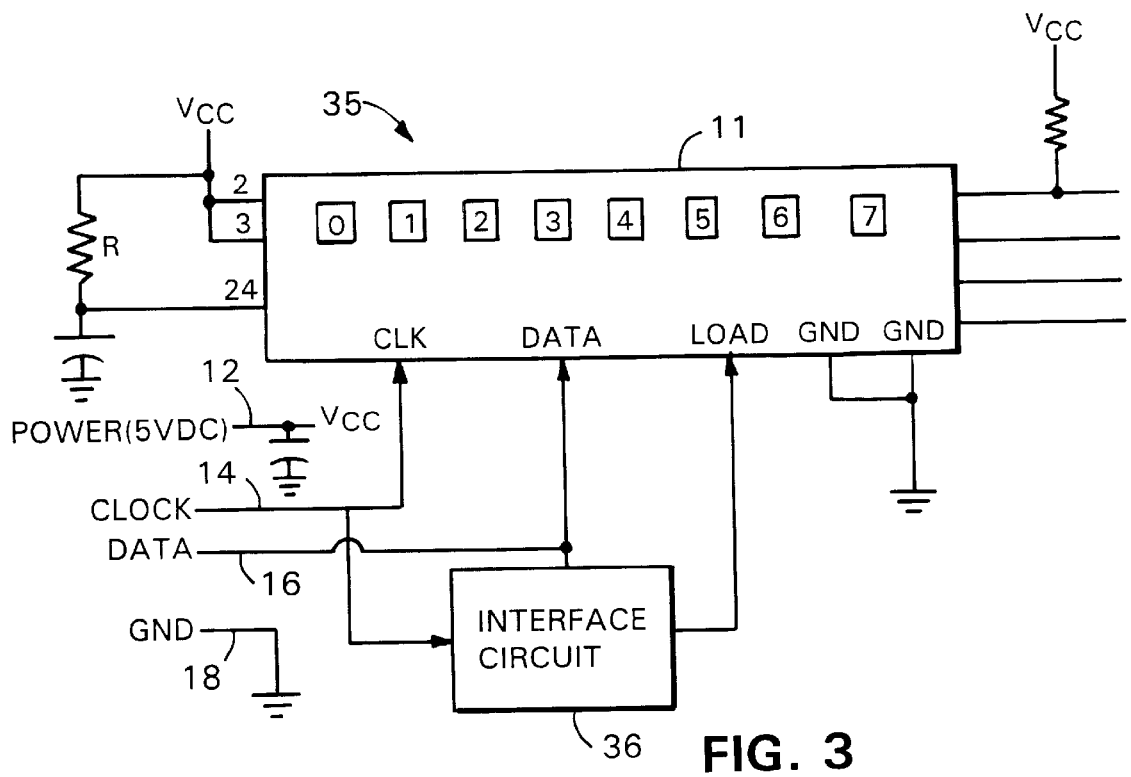
FIG. 3 illustrates an alternate implementation of an enhanced display module according to the invention.

FIG. 3 illustrates an alternate implementation of a display apparatus 35 that includes an interface circuit 36 connected to the CLOCK and DATA input lines, for generating the LOAD signal. In one embodiment, the interface circuit is a clock pulse counter circuit that counts the eighth clock transition of the CLOCK signal, or of an INV_CLOCK (inverted clock) signal. The eight bits of data, from the DATA signal, are clocked into the display module on the rising edge of the eight clock transitions. The LOAD signal remains high (inactive) until either another CLOCK signal or another INV_CLOCK signal is generated. Alternately, the interface circuit 36 is a "one-shot" circuit that is triggered by the eighth transition of the CLOCK signal (or INV_CLOCK signal) to generate the high state of the LOAD signal for a predetermined finite period of time.

In yet another implementation, the eight bits of data in the DATA signal are clocked into the display module on the rising edge of eight CLOCK transitions. In this embodiment, the interface circuit 36 is a "missing clock" detector circuit that senses when the VMC stops the CLOCK signal after the eighth transition, and generates the high state of the LOAD signal for a finite period of time. The missing clock detector circuit also senses the restarting of the CLOCK signal and sets the LOAD signal to the low state, which is synchronized to occur a finite time prior to the high to low transition of the first data bit's CLOCK signal.

In yet another alternate implementation, the POWER signal is utilized along with several components to generate the LOAD signal. In particular, the VMC of a vending machine must have control over the POWER signal, so that a unidirectional component (such as a diode) and a capacitor can be used to generate the LOAD signal. In this case, the VMC pulses the POWER signal momentarily through the diode to the capacitor which generates the LOAD signal for the display.

For example, if the POWER signal is at the rated voltage (+5 Volts DC), the LOAD signal would be at a low state. Then the eight bits of data (from the DATA signal) are clocked into the display module as required. Following the eighth bit, the POWER signal is turned OFF and then ON momentarily to cause the LOAD signal to go to the high state and then back to the low state.

A number of embodiments of the invention have been described. Nevertheless, it will be understood that various modifications may be made without departing from the spirit and scope of the invention. Consequently, other embodiments are within the scope of the following claims.

What is claimed is:

1. A display module for a vending machine, comprising:
   an enhanced display;
   an inverter connected to a CLOCK input signal generated by a vending machine controller; and
   a flip-flop connected to the inverter and to a DATA input signal generated by the vending machine controller, wherein the inverter and the flip-flop generate a LOAD signal for input to the enhanced display.

2. A display module for a vending machine, comprising:
   an enhanced display; and
   an interface circuit for creating an additional output line for generating a LOAD signal for input to the enhanced display.

3. The apparatus of claim 2, wherein the interface circuit is a clock pulse counter circuit means for counting an eighth transition of a CLOCK input signal to generate the LOAD signal.

4. The apparatus of claim 3, wherein the clock pulse counter circuit means is a one-shot circuit that is triggered by the eighth transition of the CLOCK signal.

5. The apparatus of claim 2, wherein the interface circuit is a missing clock detector circuit for sensing stoppage of a CLOCK signal and for generating a high state of the LOAD signal.

6. A display module for a vending machine, comprising:
   an enhanced display;
   a unidirectional component connected to a POWER input signal generated by a vending machine controller (VMC); and
   a capacitor connected to the unidirectional component and to the display means, wherein the VMC pulses the POWER input signal momentarily so that a LOAD signal is generated by the capacitor for the display.

7. A method for generating a LOAD signal for an enhanced display module using at least one of four interface signals generated by a vending machine controller, comprising:

generating and validating a DATA signal;

shifting bits of data for a display segment into the enhanced display module on a rising edge of a CLOCK signal if the DATA signal is valid;

inverting the CLOCK signal and latching the DATA signal to generate a LOAD signal; and loading data for a segment into a display element memory.

8. A method for upgrading a vending machine display comprising:

removing a four digit display from a vending machine controller;

connecting at least one of four interface signal lines from the vending machine controller to interface circuitry;

generating a LOAD signal on an output line of the interface circuitry for use as a fifth signal line; and connecting an enhanced display module to the four interface signal lines and to the fifth signal line.

9. The method of claim 8, further comprising upgrading software in the vending machine controller to utilize the enhanced display module.

* * * * *